Feb. 21, 1950
W. C. BARNES ET AL
2,497,856
APPARATUS AND METHOD FOR DETECTING FLAWS IN MAGNETIZABLE BODIES
Filed July 21, 1945
5 Sheets-Sheet 1
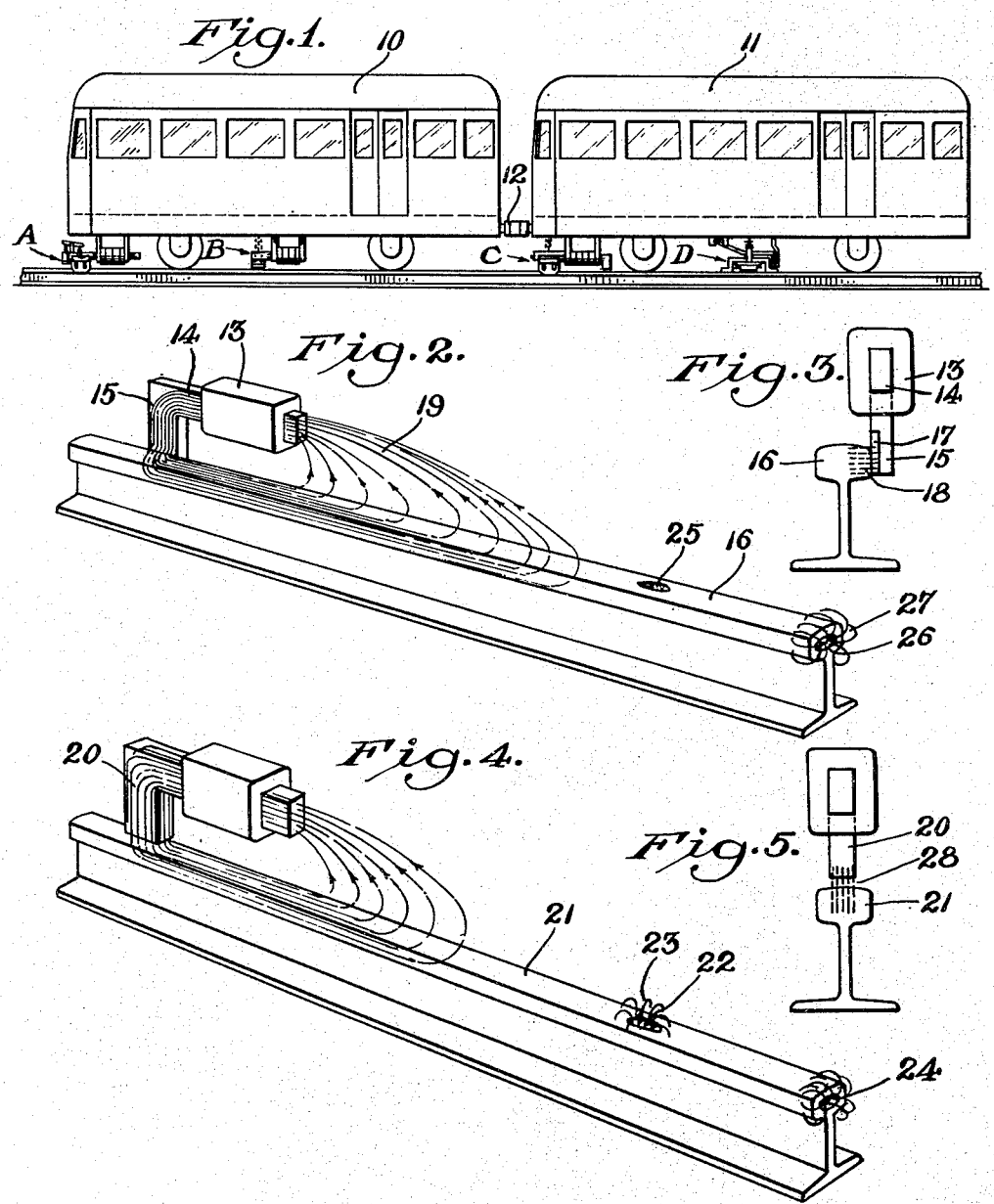
Inventors
Walter C. Barnes
Henry W. Keevil
BY
Mann and Brown
Attorneys.

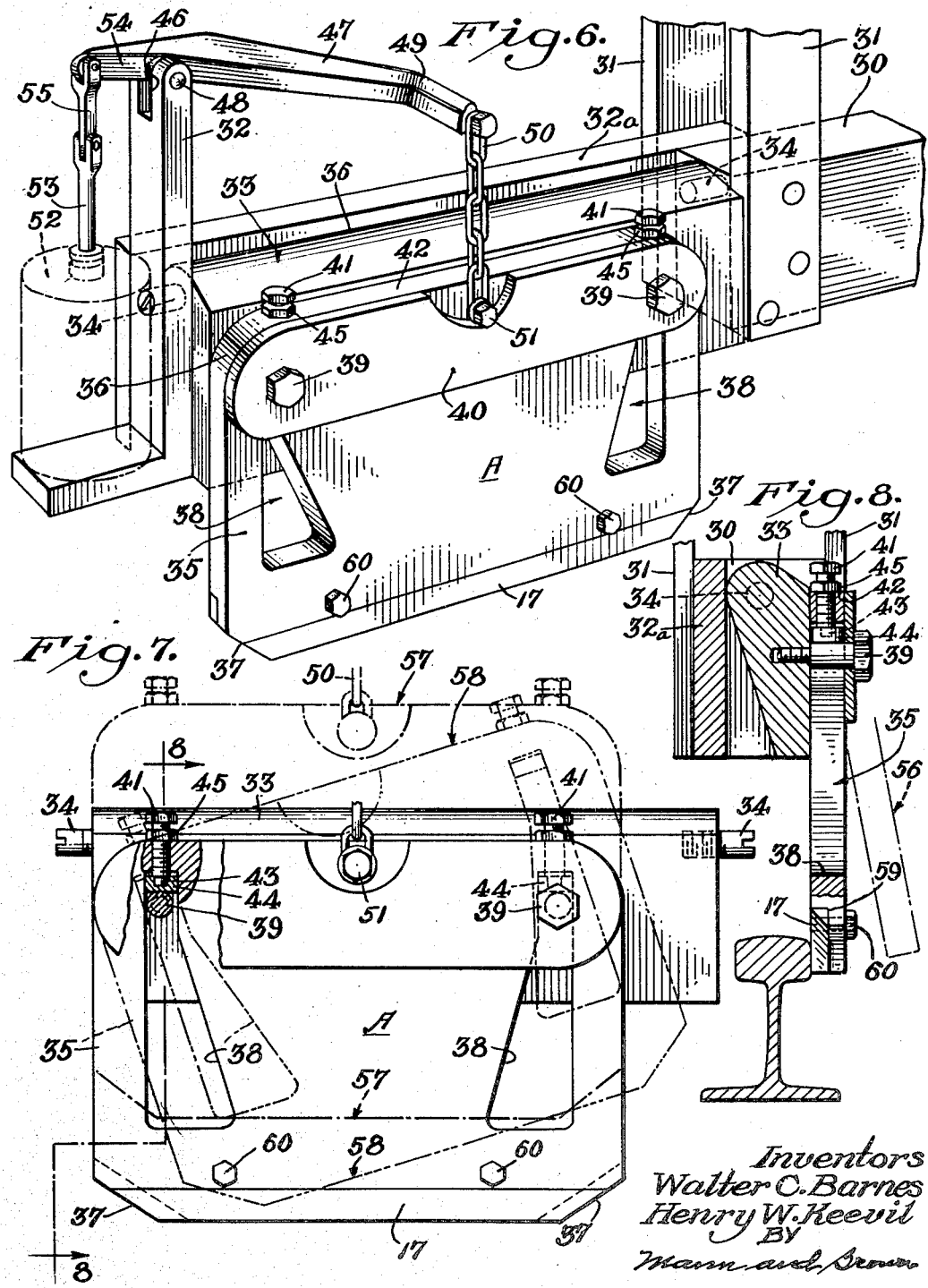

Inventors
Walter C. Barnes.
Henry W. Keevil
BY
Mann and Brown
Attorneys.

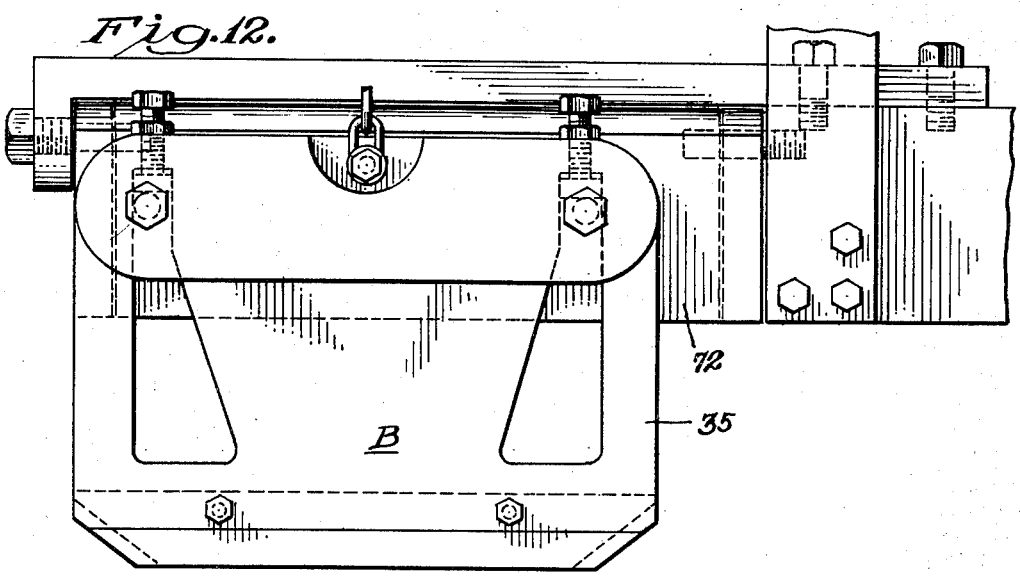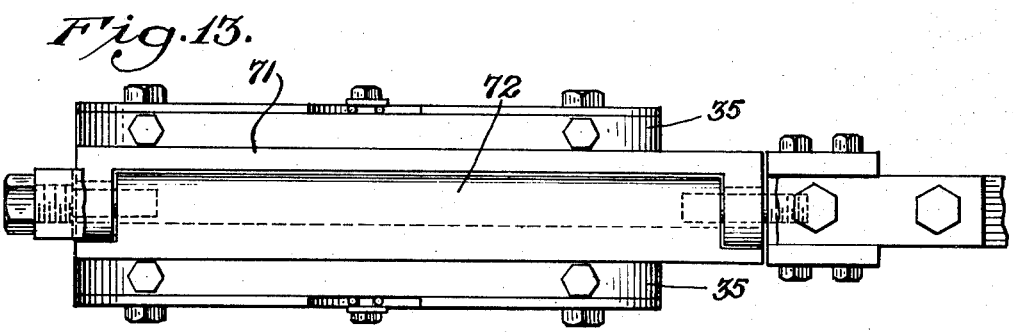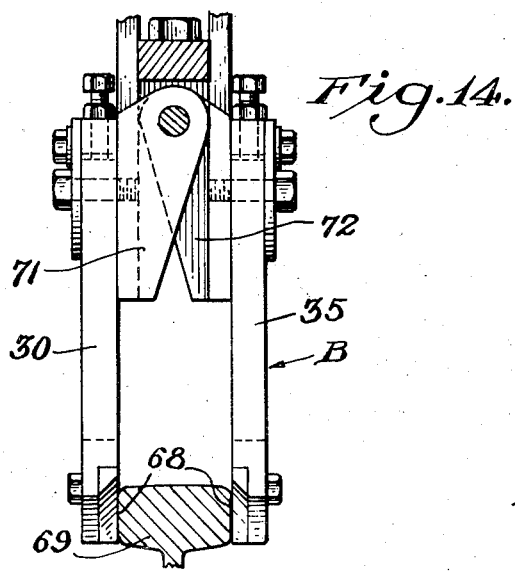

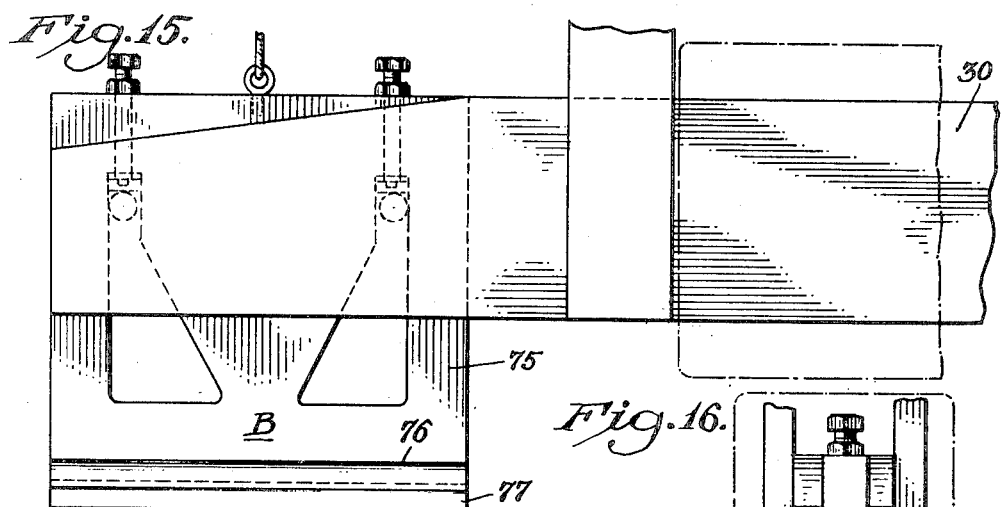
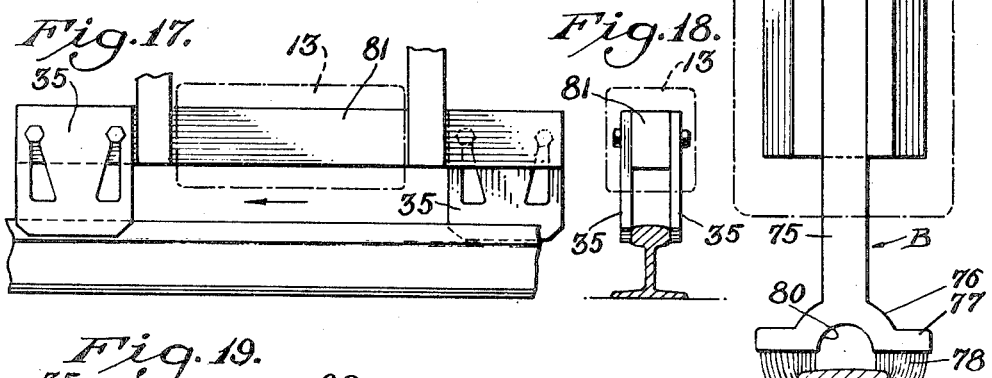
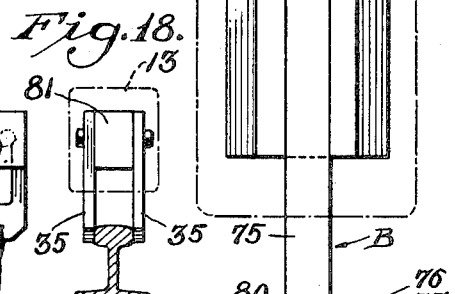
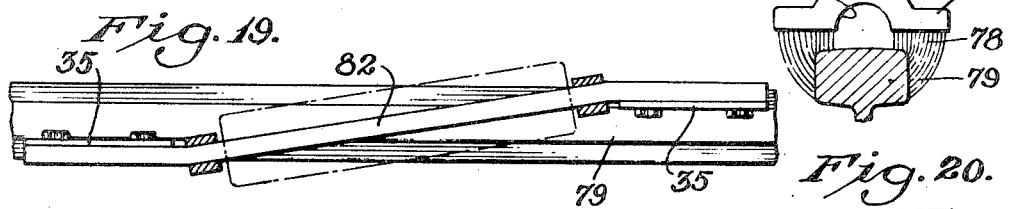
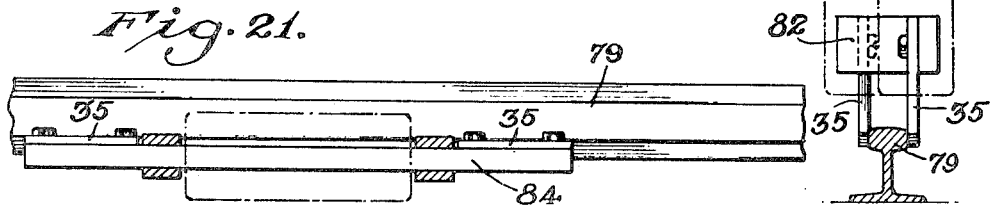
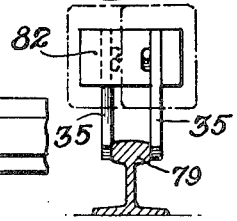
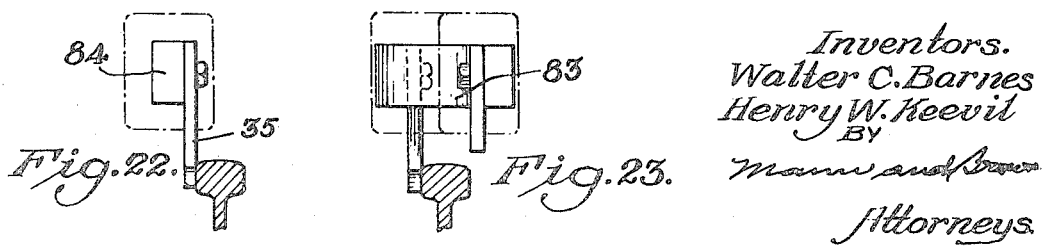

Patented Feb. 21, 1950

2,497,856

UNITED STATES PATENT OFFICE 2,497,856

APPARATUS AND METHOD FOR DETECTING FLAWS IN MAGNETIZABLE BODIES

Walter C. Barnes, Lake Bluff, and Henry W. Keevil, Evanston, Ill.

Application July 21, 1945, Serial No. 606,340

25 Claims. (Cl. 175—183)

1

The main object of testing the rails in track is to find flaws that make further use of the rail dangerous, so that timely replacement may be made. But all known means for "detecting" those flaws are so sensitive in similar ways to other things commonly present in rails that an "indication" must be followed by close inspection, and in most instances by handcheck test, to determine with practical certainty whether or not the affected rail is too dangerous for further use.

For example, in testing rail with residual magnetism apparatus following our Patents Nos. 2,317,718 and 2,317,720, April 27, 1943, engine driver burns (which may be relatively harmless) will sometimes give indications that are indistinguishable from those given by dangerous transverse fissures.

Engine driver burns are caused by slipping or spinning driving wheels which frequently create sufficient heat to melt the steel in a limited area at the running surface of the rail, and this is followed by quick quenching due to the atmosphere and the body of the rail. The result is intense hardening, frequently thought to be martensitic. Naturally, those very hard spots become and remain strongly magnetized by the field applied in testing and, being close to the path of the detector coils used in the test, will give indications corresponding to transverse fissures well down in the head of the rail below the running surface.

The principal object of this invention is to overcome the past difficulties by applying the magnetic field to the rail differently from past practice so as to avoid the strong magnetization of the driver burns by vertically directed flux from the pole of the magnet travelling along, or just above, the running surface of the rail.

Generally speaking, this is accomplished by making the magnetic field of force enter the rail head from the side and extend for the most part horizontally or longitudinally in that portion of the rail under treatment. Thus, the field relied upon to produce the desired residual magnetic conditions manifested adjacent to a transverse fissure does not pass vertically through the driver burns or otherwise subject them to strong magnetization, but it does pass or cross the transverse fissure in the head of the rail.

Perhaps the ideal condition would be obtained by passing two L-shaped or horseshoe shaped magnets along opposite sides of the rail head under test and lying at an angle somewhat like wings of an airplane, and tests so indicate, but such an arrangement is not useable on a rail in ordinary track due to turn-outs, frogs, crossings, etc., and indeed the magnet poles will generally have to be moveable to pass around or over those customary things.

2

With the driver burn indications thus suppressed, the sensitivity of the amplifiers may be increased to detect more certainly dangerous fissures down in the head of the rail.

The invention will be disclosed in apparatus especially intended to discriminate between driver burn and transverse fissure indications, but it is not thereby intended to exclude discrimination between other things in rails.

In the drawings—

Fig. 1 is a diagrammatic elevation of a tow car and a trailer car equipped with three magnets arranged in series for treating each rail in the track, and followed by an induction pick-up or detector for indicating the presence of residual magnetic conditions adjacent to transverse fissures and the like;

Fig. 2 is a perspective view illustrating the relation between the rail under test and the L-shaped magnet contemplated by this invention, together with an imaginary illustration of the field of force forming a magnetic circuit through the magnet, a portion of the rail, and across an air gap between one end of the magnet and the rail;

Fig. 3 is an end elevation looking from the right in Fig. 2;

Fig. 4 is a perspective view illustrating the general arrangement used in practice under our aforementioned patent in contrast with the arrangement shown in Fig. 2;

Fig. 5 is an end elevation looking from the right in Fig. 4;

Fig. 6 is a perspective view of one end of the core of one of the electromagnets illustrating the movable pole piece and its mounting on the core to permit lateral swinging movement about a lengthwise axis and transverse swinging movement about a crosswise axis, or up and down movement with respect to the core separately or combined with the other movements;

Fig. 7 is a side elevation of Fig. 6 showing the pole piece in solid lines in the normal position for acting upon the rail and in dotted lines in two of the other positions of which it is capable;

Fig. 8 is a section taken on the line 8—8 of Fig. 7 showing the movable pole piece in solid lines in its normal position of use and in dotted lines in a position to which it may swing;

Fig. 12 is a side elevation similar to Fig. 9 showing one end of the core of an electromagnet equipped with two pole pieces independently mounted for independent movement with respect to the core both in swinging laterally, tilting lengthwise, and rising and falling. This may be regarded as a third form;

Figure 9:
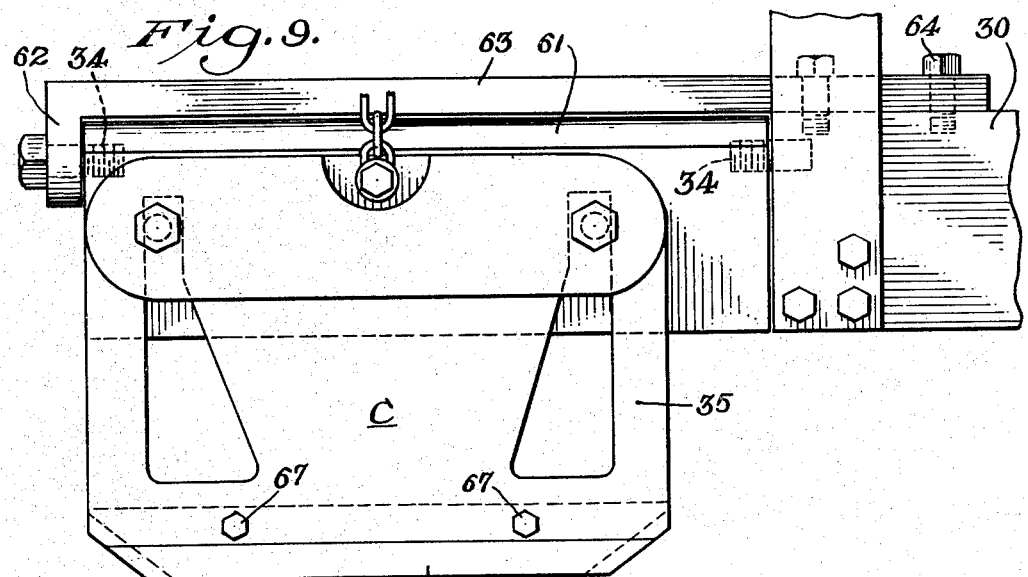
Fig. 9 is a side elevation of one end of the core of an electromagnet equipped with a second form and arrangement of pole piece support or mounting.

Fig. 13 is a plan view looking from the top in Fig. 12;

Fig. 14 is an end elevation looking from the left in Fig. 12;

Fig. 15 is a side elevation corresponding to Figs. 9 and 12 of a fourth form of mounting for the pole piece;

Fig. 16 is an end elevation looking from the left in Fig. 15;

Fig. 17 is a side elevation corresponding to Figs. 9, 12, and 15 of a fifth form;

Fig. 18 is an elevation looking from the left in Fig. 17;

Fig. 19 is a plan view illustrating a sixth form of core and pole piece by which one pole piece is disposed at one side of the rail head and the other pole piece at the other;

Fig. 20 is an end elevation looking from the left in Fig. 19;

Fig. 21 is a plan view corresponding to Fig. 19 illustrating a seventh form of core and pole piece;

Fig. 22 is an end elevation looking from the left in Fig. 21; and

Fig. 23 is an end elevation corresponding to Fig. 22 but showing one pole piece extending down on the gauge side of the rail head and an additional pole piece extending down toward the opposite side but stopping at an elevation above the rail head.

But these particular drawings and the corresponding description are intended for the purpose of disclosure only and should not be construed to impose unnecessary limitations on the claims.

In Fig. 1, 10 indicates a tow car and 11 a trailer car coupled at 12 and serving as vehicles for the entire apparatus, including a first magnet A, a second magnet B, a third magnet C, and a pick-up or detector D, arranged in series for operation with a car travelling along the rails under test from right to left. This diagrammatic arrangement conforms to the prior practice referred to embodying our inventions in residual magnetic testing.

Fig. 2 shows a simple diagrammatic arrangement embodying the present invention in which 13 is the coil of an electromagnet receiving a core bar 14 having a pole piece 15 at one end extending downwardly and running along the side face of the rail head 16. The magnetic attraction between the pole piece and the rail will force them into close, intimate contact, and, in order to take care of wear, the pole piece 15 is equipped with a replaceable wear plate 17 (Fig. 3), which may be of magnetic material capable of enduring considerable wear, or a non-magnetic material of high, wear-resistant qualities such, for instance, as manganese steel.

With the arrangement shown in Fig. 2, the magnetic circuit is in the main through the core 14, the pole piece 15, and a length of rail under treatment with the magnetism or magnetic lines of force passing from the pole piece laterally and substantially horizontally into the side of the rail head, as indicated by the lines 18 in Fig. 3.

The core 14 and the pole piece 15, together with the coil 13, form what is known as an L-shaped magnet of the type commonly used in our prior practice, and with this type of magnet the magnetic circuit is closed through a field of force generally indicated by the lines 19 in Fig. 2, which is an imaginative concept of the way in which the magnetism or lines of force spread or fan out in returning from the rail to the end of the core 14 opposite to the pole piece 15, or, as it is used in practice, to the rear end of the core. But it is contemplated with this invention that each end of the core 14 be provided with a pole piece 15, or like 15, to the end that the magnetic circuit will be entirely within magnetic material or having but a small air gap adjacent to the rear end of the circuit with respect to the motion of the car in testing.

It should be apparent from Figs. 2 and 3 that apparatus operating according to this invention so controls the magnetic circuit that, barring inconsequential leakage, there are no lines of force entering the running surface of the rail head from the pole piece 15 in a substantially vertical direction.

The significance of this is perhaps best illustrated by a comparison of Fig. 4 with Fig. 2, the former illustrating the prior practice with the pole piece 20 of the magnet running along, or just above, the running surface of the rail 21, and thus the entire energy of the magnet is communicated to the head of the rail through the running surface in substantially a vertical direction by which it necessarily exercised the greatest, or one of the greatest, magnetizing effects upon the intensely hard spot 22 in Fig. 4, indicating a driver burn, with the result that a strong magnetic field 23, or a strong manifestation of residual magnetism, remained at and adjacent to the driver burn after the magnet had passed on and unavoidably had its effect upon the detector, thus producing a strong indication comparable to a transverse fissure 24 located well down in the head of the rail.

By the procedure and arrangement contemplated in the present invention, the driver burn 25 (Fig. 2) is subjected to so little of the energy of the magnet, with practically none passing downwardly through the running surface of the rail, that it remains in effect unmagnetized, whereas the transverse fissure 26, well down in the head of the rail, is effectively magnetized or made to manifest a local magnetic condition, as indicated by the field 27.

It should also appear from Fig. 2 that the imaginary lines of force in the magnetic circuit pass through the rail head in the main, if not entirely, parallel to the running surface and lengthwise with respect to the rail head. Thus, it should appear that the magnetizing effect is of a nature best calculated to magnetize the rail for maximum residual magnetism and maximum manifestation of residual magnetism adjacent to transverse fissures and the like with a minimum of any manifestation at driver burns, such as 25, and all of that variety of other hard spots, such as hammer marks, gag marks, etc.

The contrast between the lines 18 (Fig. 3) indicating the path of the magnetism from the pole piece into the head of the rail and the lines 28 (Fig. 5) indicating the corresponding path of the prior practice distinguishes the gist of the present invention from the past practice.

Figs. 6, 7, and 8 illustrate one form in which the magnet core, the pole piece, and the pole support may be made and assembled to permit the pole piece to travel along the side of the rail head in normal testing and yet move sideways, up and down, and otherwise to avoid, pass over, or pass around familiar things in steam railway track and to accommodate the variation between the location of the magnet on the car and the curving rail on curves and at turn-outs.

The core or body of the magnet is indicated by the bar 30, supposed to be suspended beneath the car by stainless steel straps 31, and extended by a relatively thin bar 32a secured to the end of the bar 30, and equipped at its opposite end with a post 32. This provides a sort of pocket or receptacle for a pole support 33 adapted to be hinged on trunnions 34, one of which enters sockets in the adjacent ends of the piece 33 and the bar 30, and the other of which enters corresponding sockets in the opposite end of the pole support 33 and the post 32. The shape of the pole support 33 is best illustrated by the perspective view in Fig. 6 and cross section in Fig. 8, from which it will be seen that it provides clearance in the pocket or receptacle for all the appropriate swinging movement of the pole piece.

The pole piece proper 35 is a generally rectangular plate rounded at its upper corners 36, beveled at its lower corners 37, and provided with tapered slots 38 receiving and cooperating with supporting bolts 39 passing through a strap 40 on the outside and into the pole support 33 on the inner side of the pole piece 35. The bolts 39 are provided with shoulders appropriately spaced from the heads of the bolts so that when the bolts are drawn up tight there is still running play between the pole piece 35 and the pole support 33.

Nice adjustment of the pole piece on the bolts 39 is provided by bolts 41, passing down through its upper edge 42 and having cylindrical portions 43 received within shoes 44, which rest upon the bolts 39. By turning the bolts 41 to the exact position or height of the pole piece with respect to the bolts 39, the position may be set and retained by the lock nuts 45.

In order to lift the pole piece from its normal lowered position and hold it at a suitable elevation for travel or the like, the post 32 is forked at 46 and becomes the fulcrum of a lever 47 through a pin 48, the long arm of the lever being bent laterally at 49 and connected by a chain 50 with the pole piece 42 at about the middle by means of a bolt 51. The lever is operated by an air cylinder 52 equipped with a piston having a piston rod 53 connected with a short arm 54 of the lever 47 by a link 55. Air from the brake system on the car is used with this apparatus to raise the pole shoe and retain it in raised position until it is desired to lower it again, all by means of valves and piping that will be familiar to compressed air engineers.

The full line position shown in Figs. 6, 7, and 8 indicates the normal operative position of the pole piece with respect to the rail when travelling along straight track. The dotted line position 56 (Fig. 8) indicates one swinging movement of the pole piece with its pole support about a lengthwise axis. A corresponding motion in the opposite direction should be clear without illustration. Dotted position 57 in Fig. 7 shows the pole piece in partly raised position, as effected by means of the compressed air in the cylinder 52 and the lever 47 with associated parts. The dotted position 58 in Fig. 7 illustrates one of the many positions the pole piece may take in running over or accommodating itself to obstructions along the track. Obviously, it may rotate about one of the bolts 39, or about both, or combine these with an up and down movement together with a swinging movement about the trunnions 34 in order to accommodate itself to things that lie in its path as the car moves along the track.

The replaceable wear shoe 17, shown diagrammatically in Fig. 3, is shown in Figs. 6, 7 and 8 in a form suited to the purpose, and made fast in a shouldered pocket 59 by bolts 60.

If desired, a resilient hold down device (not shown) may be substituted for the chain 50 to overcome forces tending to tilt the pole piece to the dotted line position 58 during normal operation.

Figure 10:
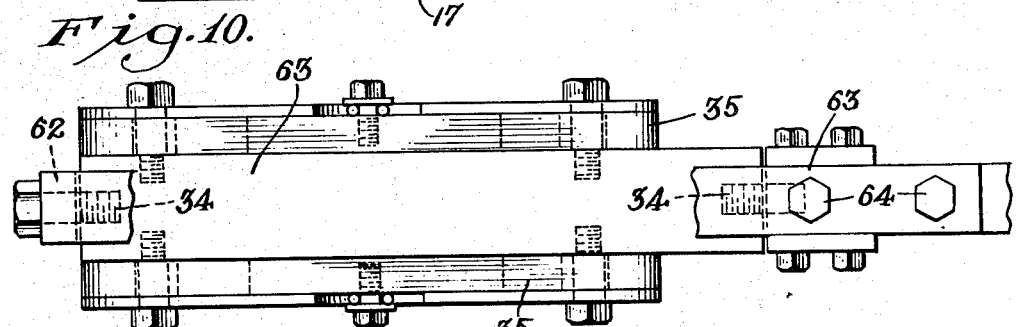
Fig. 10 is a plan view looking from the top of Fig. 9.
Figure 11:
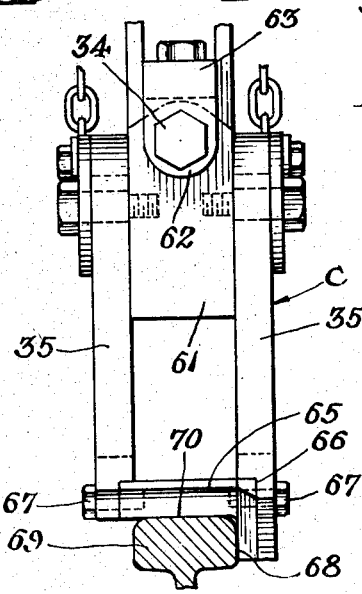
Fig. 11 is an end elevation looking from the left in Fig. 9 and showing the pole piece in normal position with respect to the rail when testing along straight away track.

In Figs. 9, 10, and 11, which correspond generally to Figs. 6, 7, and 8, there are two pole pieces 35 at each side of the pole support 61, supported on trunnions 34 in every way corresponding to those in Figs. 6, 7, and 8, except that the trunnion at the left is in the form of a bolt passing through the down-turned end 62 of a bar 63, secured to the core bar 30 by bolts 64. The two pole pieces 35 are connected at their lower edges by a non-magnetic shoe 65 fitted into shouldered recesses 66 and made fast by bolts 67. This shoe and the pole piece 35 on the right have portions that extend down along the side face 68 of the rail head 69. The opposite pole piece 35 on the left terminates not lower than the running surface 70 of the rail, which cooperates with the non-magnetic wear shoe 65.

By corresponding reference characters in Figs. 6, 7, and 8 as a group and Figs. 9, 10, and 11 as a group, the other parts and features of the structure will be clear without description. The arrangement shown in Figs. 9, 10, and 11 allows the same sort of variable movements for the two pole shoes 35 as is allowed by the single pole shoe 35 shown in Figs. 6, 7, and 8.

In Figs. 12, 13, and 14, there is a third form including two pole shoes 35, which corresponds to the arrangement shown in Figs. 9, 10, and 11 except that there are two pole supports 71 and 72, each individual to one of the pole pieces 35, and both pole pieces extend down low enough to cooperate with the side faces 68 of the rail head 69. Otherwise, the corresponding parts and features of construction are indicated by the same reference numerals.

It is not always necessary that the pole piece depend to a position alongside the side face of the rail head in order to sufficiently reduce the magnetization of driver burns and the like on, or adjacent to, the running surface of the rail. One arrangement for that purpose is shown in Figs. 15 and 16, in which the pole piece 75, mounted on the end of the core bar 30 in much the way that has been heretofore described, has a base including a sort of semi-cylindrical portion 76 and lateral flat portions 77 by which the magnetic flux, generally indicated by 78, is led into the side portions of the rail head 79 while practically no flux enters the medial portion of the running surface of the rail where the driver burns are most likely to occur due to the air gap between the curved wall 80 and the medial portion of the running surface of the rail.

Figs. 17 and 18 show an arrangement in which a rectangular core bar 81 is equipped with movable pole pieces 35 at each end, one of them depending on one side of the rail head and the other on the opposite side of the rail head substantially as shown in Fig. 18.

This and similar arrangements with a pole at each end of the core bar make the magnetic circuit more nearly closed through magnetic material than has been the practice in the past and, in some instances, offers improved application of the magnetic force without disturbing the desired conditions with respect to residual magnetism manifested in the area adjacent to fissures while suppressing, or entirely eliminating, the residual magnetism at engine driver burns on the running surface of the rail.

Figs. 19 and 20 illustrate a similar arrangement in which the rectangular core bar 82 instead of being parallel to and directly above the rail, as in Figs. 17 and 18, is at a slight angle but running generally lengthwise to the rail. As in Figs. 17 and 18, it is equipped with movable pole pieces 35, one of which is adjacent to one side of the rail head and the other adjacent to the other side of the rail head.

In arrangements such as shown in Figs. 17, 18, 19, and 20, one of the pole pieces, preferably the one to the rear with respect to the motion of the car, may be—and in many instances should preferably be—foreshortened, as indicated at 83 in Fig. 23, so as to end not lower than the level of the running surface of the rail. While such an arrangement will not have as complete circuit in magnetic material as in Figs. 17, 18, 19, and 20, it will be very much better than prior practice, and still will direct the main flow and, in most instances, all of the effective lines of force, away from the driver burns and other hard spots in the medial portion of the running surface of the rail.

Figs. 21 and 22 show another similar arrangement in which the core bar 84 is displaced to the side of the rail and the pole pieces 35 both cooperate with the same side of the rail head when two are used, but it is contemplated that only one pole piece 35 will be used at the leading end of the core bar 84.

In all forms of the invention the magnet is characterized by having a pole piece which is so constructed and arranged as to avoid concentrations of vertical flux on the top surface of the rail, and preferably so that the main body of the flux will enter the rail through one or both side edges of the rail. In this way, undesirable magnetization of superficial defects, such as engine burns, on the top surface of the rail is avoided.

It should be noted that in the form of the invention shown in Figs. 6, 7 and 8, as well as the one shown in Figs. 12, 13, and 14, the point of lift for the pole piece is laterally displaced from the axis of pivot rotation so that upon lowering the pole piece to the rail it automatically is held in an inclined position as shown at 56 in Fig. 8 with the result that the pole piece always finds its proper position alongside the rail edge. When the pole piece reaches the end of its downward travel, tension on the chain 50 is released and the pole piece swings into its operative position.

In applying the present invention to actual practice, much the same things which affect the design of the A, B, and C magnets as heretofore used, as indicated in our Patent No. 2,317,720, will have like effect in design of those magnets to embody this invention. For example, the A magnet will be the powerful one mainly relied upon for shaking up the molecules in the rail and doing the main work of magnetizing. It is desirable to have the pole pieces of that magnet actually maintain running contact with the rail head, and if wear shoes are to be used they are preferably of magnetic material. The construction shown in Figs. 6, 7, and 8 is particularly well suited for the A magnet, as is also the form shown in Figs. 12, 13 and 14. The B magnet will be relied upon to give the rail a second magnetic treatment, but, in the main, it will be found preferable to reduce the strength of that magnet as compared with the A magnet, and the pole piece will generally be held in spaced relation with or out of contact with the head of the rail. The form of the invention shown in Figs. 15 and 16 is particularly well adapted to the requirements for the B magnet. The C magnet, as in the prior practice, will act mainly as a clean-up magnet, demagnetizing the surface of the rail that has been most directly affected by the A and B magnets. The form shown in Figs. 9, 10, and 11 is particularly well suited for the C magnet.

We claim:

1. In apparatus for detecting flaws in rail, the combination of a rail to be tested, a car adapted to move forwardly on said rail, a magnet mounted on the car for sending a strong magnetic flux longitudinally through the rail and including a core lengthwise to the rail, and a pole piece on the core directing the magnetic flux to the side of the rail head, and shaped to prevent concentration of flux through the top surface of the rail head, said pole piece being positioned with respect to the rail so that the mean air gap between said pole piece and a side surface of the rail is less than the mean air gap between said pole piece and the running surface of the rail.

2. In apparatus for detecting flaws in rail, the combination of a rail to be tested, a car adapted to move forwardly on said rail, a magnet mounted on the car for sending a strong magnetic flux longitudinally through the rail and including a core lengthwise to the rail, and a pole piece on the core extending along the side of the rail head, said pole piece having no substantial portion overlying the top surface of the rail head and being displaced in a direction transverse to the longitudinal axis of the rail.

3. In apparatus for detecting flaws in rail, the combination of a rail to be tested, a car adapted to move forwardly on the rail, a magnet mounted on the car for sending a strong magnetic flux through the rail and including a bar lengthwise to the rail, and a pole piece depending from the bar and having its lower extremity lying alongside one side of the rail head, said pole piece being hinged to swing laterally about an axis lengthwise to the rail and having a lost motion connection with the bar permitting it to move up and down with respect to the bar.

4. In apparatus for detecting flaws in rail, the combination of a rail to be tested, a car adapted to move on said rail, a magnet mounted on the car for sending a strong magnetic flux through the rail and including a bar lengthwise to the rail, and a pole piece depending from the bar and having its lower extremity lying alongside one side of the rail head, said pole piece being hinged to swing laterally about an axis lengthwise to the rail and having a lost motion connection with the bar permitting it to move up and down with respect to the bar bodily and by rotation.

5. In apparatus for detecting flaws in rail, the combination of a rail to be tested, a car adapted to move forwardly on the rail, a magnet mounted on the car for sending a strong magnetic flux through the rail and including a bar lengthwise to the rail, a pole support hinged to the bar to swing about a lengthwise axis, and a pole piece carried by the pole support, said pole piece being displaced laterally with respect to a vertical plane longitudinally through the center of the rail.

6. In apparatus for detecting flaws in rail, the combination of a rail to be tested, a car, a magnet mounted on the car for sending a strong magnetic flux through the rail and including a bar lengthwise to the rail, a pole support hinged to the bar to swing about a lengthwise axis, and a pole piece having a pin and slot connection with the pole support and being displaced laterally with respect to a vertical plane longitudinally through the center of the rail.

7. In apparatus for detecting flaws in rail, the combination of a rail to be tested, a car, a magnet mounted on the car for sending a strong magnetic flux through the rail and including a bar lengthwise to the rail, a pole support hinged to the bar to swing about a lengthwise axis, a pole piece having a pin and slot connection with the pole support, and means to lift the pole piece within the limit of the pin and slot connection, said pole piece being displaced in a direction transverse to the longitudinal axis of the rail and further positioned with respect to the running surface of the rail and a side surface of the rail so that the mean air gap between said pole piece and the side surface of the rail toward which the pole piece is displaced is less than the mean air gap between said pole piece and the running surface of the rail.

8. The method of testing rail for flaws which includes bringing successive portions of the rail into a magnetic circuit with a field of force entering the rail from the side of the head and extending lengthwise to it, and with only a minor part of the field entering the rail through the top surface thereof, and then testing the portions of the rail thus magnetized for traces of residual magnetism.

9. The method of testing rail which includes continuously forming a magnetic circuit through successive portions of a rail with the field entering the rail head from the side and extending lengthwise to it, and with only a minor part of the field entering the rail through the top surface thereof, and then testing the portions of the rail thus magnetized for traces of residual magnetism.

10. In apparatus for detecting flaws in rail, the combination of a rail to be tested, a car adapted to move forwardly on said rail, a magnet mounted on the car for sending a strong magnetic flux through the rail and including a bar lengthwise to the rail, a pole support hinged to the bar to swing about a lengthwise axis, a pole piece extending parallel to the pole support and depending therefrom, said pole piece being displaced laterally with respect to a vertical plane longitudinally through the center of the rail, and means including a pair of pin and slot connections for attaching the pole piece to the pole support for relative movement therebetween.

11. In apparatus for detecting flaws in rail, the combination of a rail to be tested, a car adapted to be moved forwardly on said rail, a magnet mounted on the car for sending a strong magnetic flux longitudinally through the rail including a bar generally lengthwise to the rail, a pole support hinged to the bar to swing about a lengthwise axis, a downwardly extending pole piece movably carried by the pole support, said pole piece being displaced in a direction transverse to the longitudinal axis of the rail and further positioned with respect to the rail so that the mean air gap between said pole piece and a side surface of the rail is less than the mean air gap between said pole piece and the running surface of the rail, and means for raising the pole piece.

12. In apparatus for detecting flaws in rail, the combination of a rail to be tested, a car adapted to move forwardly on the rail, a magnet mounted on the car for sending a strong magnetic flux longitudinally through the rail including a bar generally lengthwise to the rail, a pole support hinged to the bar to swing about a lengthwise axis, a downwardly extending pole piece movably carried by the pole support, said pole piece being so positioned with respect to the rail that the mean air gap between the pole piece and a side of the rail is less than the mean air gap between the pole piece and the top surface of the rail, means for raising the pole piece, said means comprising a lever, a member connecting the pole piece to the lever, and means controllable from a remote point for moving the lever about its fulcrum.

13. In apparatus for detecting flaws in rail, the combination of a rail to be tested, a car adapted to move on said rail, a magnet mounted on the car for sending a strong magnetic flux longitudinally through the rail including a bar generally lengthwise to the rail, a pole support hinged to the bar for movement about a lengthwise axis, a pin projecting laterally from the pole support, and a slotted pole piece movably supported by the pin which extends into the slot in the pole piece, said pole piece being displaced in a direction transverse to the longitudinal axis of the rail and being separated from a side of the rail by an air gap which is shorter than the air gap separating the pole piece from the running surface of the rail.

14. In apparatus for detecting flaws in rail, the combination of a rail to be tested, a car adapted to move forwardly on said rail, a magnet mounted on the car for sending a strong magnetic flux longitudinally through the rail including a bar generally lengthwise to the rail, means for supporting a pole piece from the bar for movement relative thereto, said means comprising a pair of laterally projecting pins, a pole piece supported by the pins and having slots formed therein cooperating with the pins, said slots being shaped to permit pivotal movement of the pole piece with respect to at least one of the pins, said pole piece being displaced laterally with respect to a vertical plane longitudinally through the center of the rail by a distance such that the mean air gap between the pole piece and a side of the rail is less than the mean air gap between said pole piece and the running surface of the rail.

15. In apparatus for detecting flaws in rail, a car, a magnet mounted on the car for sending a strong magnetic flux longitudinally through the rail including a bar generally lengthwise to the rail, a pole support member hinged to the bar for movement about a lengthwise axis, a pole piece member movably carried by the pole support member, one of said members having a pair of spaced slots formed therein and a pair of pins extending through the slots into the other of said members, said slots being shaped and disposed to permit pivotal movement of the pole piece with respect to at least one of the pins, and vertical movement with respect to both pins.

16. In apparatus for detecting flaws in rail, the combination of a rail to be tested, a car adapted to move on said rail, a magnet mounted on the car for sending a strong magnetic flux longitudinally through the rail and including a core lengthwise to the rail, a pole piece on the core extending downwardly on one side of the rail head to a point below the running surface thereof, and a shoe of wear-resistant metal secured to the pole piece and disposed to engage the rail head, the distance between said pole piece and a side of the rail being less than the distance between said pole piece and the running surface of the rail.

17. In apparatus for detecting flaws in rail, the combination of a rail to be tested, a car adapted to be moved forwardly on said rail, a magnet mounted on the car for sending a strong magnetic flux longitudinally through the car including a core generally lengthwise to the rail, a pole support, a pole piece extending downwardly from the pole support to a side of the rail head, said pole piece being displaced laterally with respect to a vertical plane longitudinally through the center of the rail, a pin fixed to the pole support and extending through a slot in the pole piece, and adjustable means including a screw extending through the pole piece normal to the axis of the pin for limiting movement of the pole piece relative to the pin in one direction.

18. In apparatus for detecting flaws in rail, the combination of a rail to be tested, a car adapted to be moved forwardly over said rail, a magnet mounted on the car for sending a strong magnetic flux longitudinally through the rail and including a core lengthwise to the rail, a pair of pole supports each hinged to the core for movement about a lengthwise axis, and pole pieces movably supported by the pole supports for directing flux into a side of the rail head, said pole pieces being displaced in a direction transverse to and on opposite sides of the longitudinal axis of the rail, each of said pole pieces being separated from a side of the rail by an air gap which is less than the air gap separating said pole piece from the running surface of the rail.

19. In apparatus for detecting flaws in rail, the combination of a rail to be tested, a car adapted to be moved forwardly over said rail, a magnet mounted on the car for sending a strong magnetic flux longitudinally through the rail and including a core lengthwise to the rail, a pair of pole supports each hinged to one end of the core for movement about a lengthwise axis, and pole pieces movably supported by the pole supports and positioned substantially closer to the side of the rail than to the running surface of the rail so as to direct flux into the rail head through both sides thereof.

20. In apparatus for detecting flaws in rail, the combination of a rail to be tested, a car adapted to be moved forwardly over said rail, a magnet mounted on the car for sending a strong magnetic flux longitudinally through the rail and including a core lengthwise to the rail, and pole means for introducing magnetic flux into the rail through one side of the rail head and for causing such flux to leave the rail head through the other side thereof without a concentrated flux path through the top surface of the rail head, said means comprising a pole piece which is displaced laterally from a vertical plane longitudinally through the center of the rail and separated from the running surface of the rail by an air gap which is greater than that which separates it from the side of the rail, at least a portion of said core being disposed diagonally across the rail head.

21. The method of testing rail for flaws which includes bringing successive portions of the rail into a magnetic circuit with a field of force entering the rail from one side of the head, thence progressing longitudinally through the rail and leaving the rail head from the other side thereof, and with only a minor part of the field traversing the top surface of the rail head whereby the magnetization of rail burns and like superficial defects on the top surface of the rail head is minimized, and then testing the portions of the rail thus magnetized for traces of residual magnetism.

22. In a method of testing magnetized rail for flaws, the steps of bringing successive portions of the rail into a magnetic circuit with a field of force entering the rail from the side of the head and extending lengthwise to it, and with only a minor part of the field entering the rail through the running surface thereof.

23. In a method of determining flaws in rail by subjecting the rail to a magnetic flux and then testing the rail for traces of residual magnetism, the improvement which consists in continuously forming a magnetic circuit through successive portions of a rail with the field entering the rail head from the side, extending lengthwise to it, and with only a minor part of the field entering the rail through the top surface thereof.

24. In a method of testing rail for flaws which comprises subjecting the rail to a magnetic flux and then testing the rail for traces of residual magnetism, the improvement which includes the steps of bringing successive portions of the rail into a magnetic circuit with a field of force entering the rail from one side of the head, thence progressing longitudinally through the rail and leaving the rail head from the other side thereof, and with only a minor part of the field traversing the top surface of the rail head whereby the magnetization of rail burns and similar superficial defects on the top surface of the rail head is minimized.

25. In an apparatus for inducing residual magnetism of a predetermined character in a rail or the like, a car movable forwardly along a rail, and a magnet on the car for introducing longitudinal magnetic flux into the rail, said magnet comprising a core positioned lengthwise and substantially parallel to the rail and having one of its poles positioned alongside an edge of the rail with substantially no portion of said pole positioned directly over the rail in close proximity thereto for directing substantially the entire magnetic flux into a side of the rail, and its other pole shaped and arranged to maintain the flux concentration below the top surface of the rail and prevent concentration of flux through the top surface thereof.

WALTER C. BARNES.
HENRY W. KEEVIL.

REFERENCES CITED

The following references are of record in the file of this patent:

UNITED STATES PATENTS

| Number | Name | Date |
|---|---|---|
| 1,765,715 | Byers | June 24, 1930 |
| 1,958,079 | Billstein | May 8, 1934 |
| 2,083,896 | Drake et al. | June 15, 1937 |
| 2,252,424 | Bigelow | Aug. 12, 1941 |
| 2,265,137 | Barnes et al. | Dec. 9, 1941 |
| 2,311,715 | Thorne | Feb. 23, 1943 |